C. A. LITTLEFIELD.
HOLDING DEVICE FOR LOOM TEMPLES.
APPLICATION FILED JULY 27, 1910.
979,774.
Patented Dec. 27, 1910.
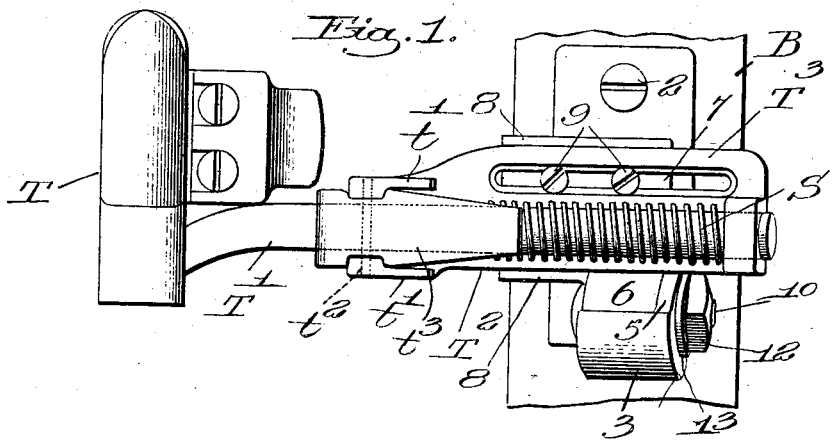
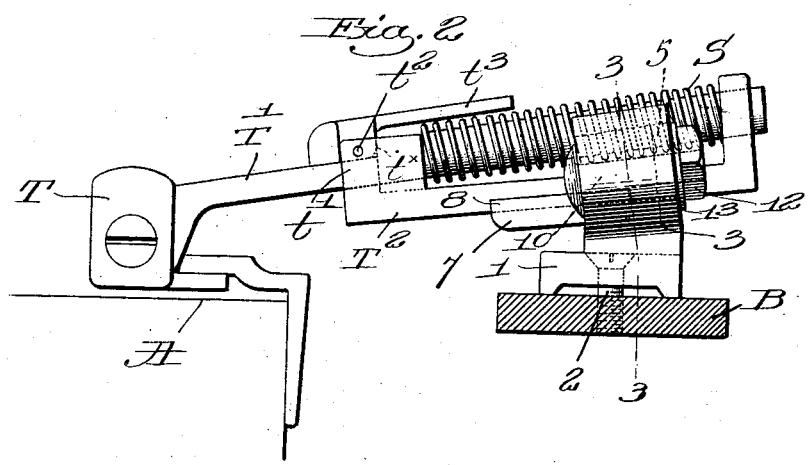
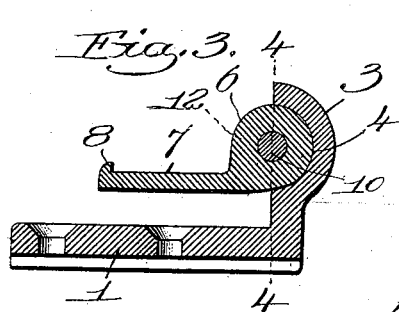
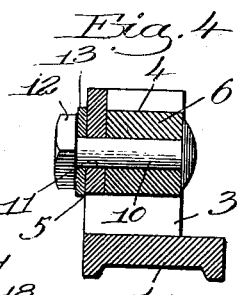
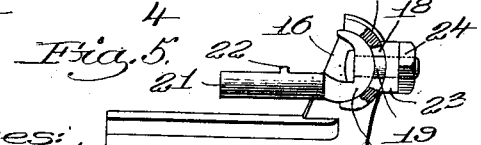

UNITED STATES PATENT OFFICE.

CHARLES A. LITTLEFIELD, OF LOWELL, MASSACHUSETTS, ASSIGNOR TO DRAPER COMPANY, OF HOPEDALE, MASSACHUSETTS, A CORPORATION OF MAINE.

HOLDING DEVICE FOR LOOM-TEMPLES.

979,774.

Specification of Letters Patent.

Patented Dec. 27, 1910.

Application filed July 27, 1910. Serial No. 574,071.

*To all whom it may concern:*

Be it known that I, CHARLES A. LITTLEFIELD, a citizen of the United States, and resident of Lowell, county of Middlesex, State of Massachusetts, have invented an Improvement in Holding Devices for Loom-Temples, of which the following description, in connection with the accompanying drawing, is a specification, like characters on the drawing representing like parts.

This invention has for its object the production of a novel and efficient holding device for supporting the loom-temple on the breast-beam of the loom, so constructed and arranged that the temple head can be tipped on an axis substantially at right angles to the breast-beam, whereby the angle of the temple head and the roll carried thereby can be easily and accurately adjusted with relation to the plane of the race-plate on the lay.

With the various types of so-called bar temples, wherein the temple head is fixedly mounted on a bar adapted to reciprocate longitudinally in a stand the wear of the bar and stand, in the regular operation of the loom, tends to tip down or depress the point of the pod and the adjacent end of the roll toward the race-plate. If this is not noticed and promptly corrected the lay will be worn or the temple will be broken, either or both, and in any event the cloth being woven is very apt to be injured.

So far as I am aware all bar temples are open to the objections stated, and the longer the temple roll and the more difficult the cloth handled the greater will be the resulting trouble. Attempts have been made to remedy this trouble with bar temples, but the devices having that end in view are more or less complicated and expensive, are hard to adjust, and are not readily adapted to the various patterns of bar temples.

The holding device embodying my present invention is very simple in its construction, it can be easily and quickly adjusted, and it can be applied to various forms of bar temples.

Loom temples are always subjected to relatively heavy strains, even when fine fabrics are being woven, because the transverse pull of the fabric tends to draw the temple head inward except at the instant of beat-up, and in weaving some kinds of heavy fabric the strain on the temple heads is very great. With the structure embodying my present invention the temple head is enabled to resist this strain in a thoroughly satisfactory manner.

The various novel features of my invention will be fully described in the subjoined specification and particularly pointed out in the following claims.

Figure 1 is a top plan view of a well known form of bar temple mounted on a holding device embodying one form of my invention; Fig. 2 is a side elevation thereof; Fig. 3 is a transverse sectional detail on the line 3—3, Fig. 2, looking toward the right; Fig. 4 is a section taken on the line 4—4, Fig. 3, showing the adjusting feature of the holding device; Fig. 5 is a view in elevation of a slightly different form of holding device, to be referred to.

Referring to Figs. 1 and 2, the temple head T containing the usual roll, (not shown) the slide-bar T' longitudinally movable in ears on the stand $T^2$, the spring S to move the bar rearward, and the slotted flange $T^3$ on the stand, Fig. 1, may be and are in general all of substantially well known construction.

The rearmost ear of the stand is bifurcated at $t'$, $t'$ to receive the bar T', which is held down by a cross-pin $t^2$, and between the bifurcations is pivoted on said pin a latch $t^3$ adapted to be pushed down into engagement with a shoulder $t^\times$ on the bar when it is desired to maintain the temple head retracted.

The holding device, Figs. 1 to 4, comprises a base-plate 1 adapted to be secured to the breast-beam B by suitable fastening screws 2, the base-plate being upturned at one end at 3 to present a strong and elongated substantially semi-circular bearing 4, having its axis parallel to the slide-bar T, said bearing being closed at its front end, at 5, and open at its rear end and inner side.

Into the bearing fits the cylindrical, tubular boss 6 forming a part of a flat shelf-like seat 7 preferably having retaining lips 8 along its inner and outer edges. Upon said seat and positioned between the lips 8 the temple stand $T^2$ is mounted, and held securely thereon by screws 9 passed through the slotted flange $T^3$.

The stand can be adjusted in a fore and aft direction upon the seat, as will be manifest, the seat 7 overhanging the base-plate 1, as shown.

A headed fulcrum and locking stud 10 is passed through the boss 6 and through an axial aperture 11, Fig. 4, in the end 5 of the bearing, and by means of a nut 12 screwed onto the front end of the stud the boss and its attached seat are clamped securely in the bearing 4, a washer 13 being interposed between said nut and the adjacent end of the bearing.

By loosening the nut the seat 7 can be tipped up or down about an axis coincident with the longitudinal center of the bearing, in parallelism with the path of movement of the slide-bar T', and by such tipping the temple-head T will be tipped to bring the axis of the usual roll carried thereby into parallelism with the race-plate of the lay, indicated at A, Fig. 2. When such parallelism is effected the nut is set up, thereby clamping the seat and its boss in adjusted position, and maintaining the temple-head in proper position, inasmuch as the temple-stand is fixedly secured to the seat. The bearing thus provided presents a practically semi-cylindrical surface of considerable length, into which fits in a cup-like manner the semi-cylindrical surface of the boss, so that a firm engagement between the two parts is effected, such engagement being maintained by the clamping nut when set up on the rigid locking stud 10 which is coaxial with the boss and the bearing. By this construction the seat 7 is held with great rigidity and firmness in the desired adjusted position, and is capable of resisting any transverse strain to which the temple head is subjected by the pull of the cloth. Consequently the temple head is maintained in proper position with the toothed roll in the desired relation to the travel of the cloth, obviating any tendency to tear or damage the cloth by twisting or "cocking" of the temple head.

Fore and aft adjustment of the temple as a whole can be made at any time, by means of the screws 9 and the slotted flange T³, without interference with the tipping adjustment of the seat 7 in its bearing 4.

The holding device described can be used with any ordinary pattern of bar temple and on looms having a breast-beam so constructed that the base-plate of the holding device can be secured to the upper face thereof.

In certain loom structures the breast-beam is of such shape that it is more convenient to attach the holding device at the front of the beam, and a slight modification of the holding device is required in such cases, as shown in Fig. 5. Therein the base-plate 14, having openings 15 for the attaching screws, is applied in a substantially upright position to the front of the breast-beam, and at one end the base-plate has an upturned ear 16 from which extends laterally a semicircular, open bearing 17 having an elongated slot 18 in its wall, to receive the clamping bolt or stud 19.

The head of the stud bears against an externally semicircular boss 20 having extended from it a seat 21 for the temple-stand, and I have shown a positioning rib 22 on the upper face of the seat. The clamping stud passes through the boss 20 and the slot 18 of the bearing, and through a washer 23 concaved on one face to fit the exterior of the bearing, a clamping nut 24 screwed onto the stud being set up against the washer to clamp the boss in position in the bearing.

The coöperating faces of the bearing and the boss are of the same circular curvature, so that by loosening the nut 24 the seat 21 can be tipped up or down about the longitudinal axis of the bearing as a fulcrum, to thereby adjust the temple head in parallelism with the race-plate of the lay, as before.

In practice the seat 21 is provided with apertures for the reception of screws or other fastening members to secure the temple-stand upon the seat, said stand being guided or positioned by the rib 22.

When the modified form of holding device is mounted on the breast-beam the longitudinal axis of the bearing 17 will be inclined in a fore and aft direction, as shown in the device illustrated in Fig. 2, in parallelism with the path of movement of the temple bar.

What has been said of the strength and rigidity of the structure illustrated in Figs. 1 to 4 applies equally to the modified structure, Fig. 5, as will be apparent, and in both forms the bearing presents a semi-cylindrical surface into which the boss enters and is securely and strongly held in engagement therewith.

In either form of holding device herein illustrated it will be observed that the axis about which the seat is tipped is beyond the outer side of the temple-stand, so that there is no interference with the cloth being woven, and hence no limitation upon the width of the goods is imposed by the use of my holding device.

The elevation of the temple-stand seat above the base-plate of the holding device provides ample clearance for the cloth to pass beneath the seat and over the base-plate to the take-up mechanism.

Having fully described my invention, what I claim as new and desire to secure by Letters Patent is:—

1. A holding device for loom-temples, comprising a base-plate, a transverse and elongated substantially semi-circular, open-sided bearing thereon at one end, a seat for the temple-stand, a boss fixedly connected therewith and having a curved face to frictionally engage and fit the semi-circular wall of the bearing, whereby the seat can be tipped about the longitudinal axis of the bearing as a center, and means to clamp the boss in adjusted position in the bearing, the cup-like fit of the boss in the bearing rigidly positioning the seat to resist strain upon the temple-stand due to the inward pull of the cloth.

2. A holding device for loom-temples, comprising a base-plate having an upturned and enlarged portion at its outer end, a transversely extended and elongated bearing on such upturned portion, open at its rear end and inner side and having its longitudinal axis inclined in parallelism to the path of movement of the temple bar, a seat for the temple-stand, and a boss on the outer end of the seat provided with a circularly curved and elongated face to enter the open side of and fit said bearing and to turn therein on the axis of the bearing as a center, the seat projecting inward over the base-plate, a stud connecting the boss and the bearing while permitting rotative movement of the boss, and a clamping nut coöperating with said stud to hold the boss and its connected seat in adjusted position, the coöperating semi-cylindrical surfaces of the boss and the bearing serving to rigidly position the seat and prevent twisting thereof when the clamping nut is set up.

3. A holding device for loom-temples, comprising a base-plate adapted to be secured to the loom breast-beam, a seat for the temple-stand, overhanging the base-plate, a pivotal connection between the outer ends of said base-plate and seat, said connection comprising an elongated, open-sided and substantially semi-circular bearing on one of said parts and an elongated, externally convexed coöperating member on the other part, to enter the open side of and fit into the bearing, whereby the seat can be tipped by relative rotative movement of said bearing and the coöperating member, and means to clamp together the latter and the bearings to thereby maintain the seat in adjusted position, the coöperating semi-cylindrical surfaces of the bearing and its coöperating member, when clamped together, holding the seat from twisting when the temple-stand is subjected to lateral strains due to the inward pull of the cloth.

In testimony whereof, I have signed my name to this specification, in the presence of two subscribing witnesses.

CHARLES A. LITTLEFIELD.

Witnesses:
FISHER H. PEARSON,
D. J. F. SPINNEY.